March 23, 1926.
E. M. KRUEGER
COMPOUND METER VALVE
Filed June 23, 1921
1,577,731
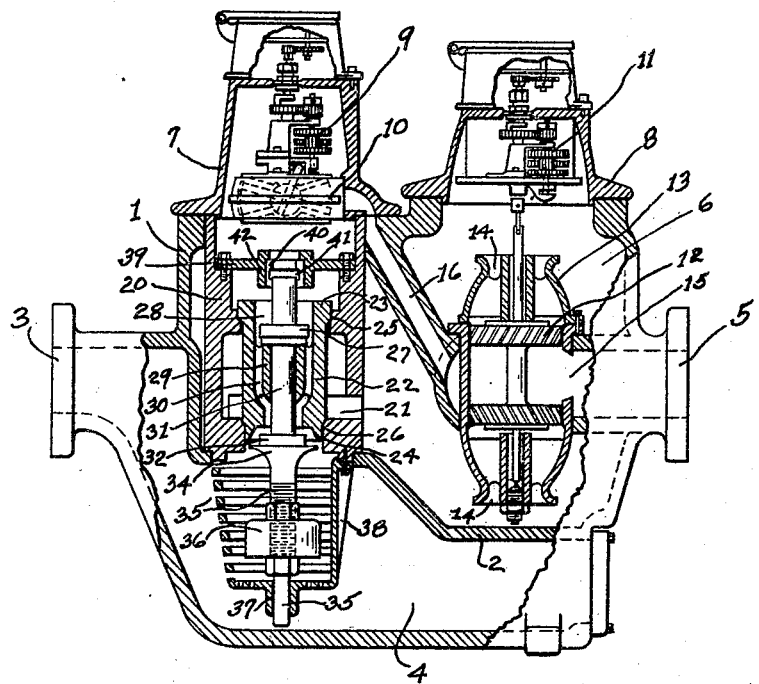
INVENTOR.
Emil M. Krueger
BY
Erwin Wheeler & Woolard
ATTORNEYS.

Patented Mar. 23, 1926.

1,577,731

UNITED STATES PATENT OFFICE.

EMIL M. KRUEGER, OF MILWAUKEE, WISCONSIN, ASSIGNOR TO BADGER METER MFG. COMPANY, OF MILWAUKEE, WISCONSIN, A CORPORATION OF WISCONSIN.

COMPOUND METER VALVE.

Application filed June 23, 1921. Serial No. 479,769.

*To all whom it may concern:*

Be it known that I, EMIL M. KRUEGER, a citizen of the United States, residing at Milwaukee, county of Milwaukee, and State of Wisconsin, have invented new and useful Improvements in Compound Meter Valves, of which the following is a specification.

This invention relates to improvements in valve mechanism for compound meters.

It is the object of this invention to provide in a compound meter a valve operably by the flow of the water instead of by the pressure of the water. Compound meters are provided with two separate types of metering apparatus, one of which is adapted to measure small flows of water while the other is adapted to measure larger flows. It is customary to provide automatic valves intended to be opened by differential pressures to close the inlet to the low capacity metering mechanism and open the inlet to the high capacity metering mechanism when the flow of water has reached a predetermined amount. The automatic valves, hitherto used for this purpose, have been made with differential diameters, the larger face being exposed to water at the pressure of the main and the smaller face being exposed to the water in the interior of the chamber containing the low volume metering apparatus. In the devices so equipped, a weight is used to oppose the opening of the valve until the differential pressure reaches a predetermined value. Valves so operated by differential pressures alone are extremely inaccurate because any corrosion in the low capacity meter chamber or anything causing friction or tending to reduce the speed of the water passing thru said chamber will produce a back pressure affecting the opening of the valve.

A further disadvantage in the use of the old type of valve results from the fact that a relatively large weight must be used to oppose the action of the water upon the differential valve. After such a valve has been opened by the requisite pressure variation, the resistance to its opening remains a constant determined by the size of the weight and continues to absorb a large amount of the water pressure, viz:—the amount needed to hold the valve open during the operation of the large capacity meter.

It is one of the objects of this invention to provide means whereby a relatively small weight may be used. As will hereinafter be explained, this invention includes means whereby the main valve is held closed by differential pressure instead of being opened thereby, and a small control valve normally held open by a weight is actuated by the water flow to control the movement of the main valve. In this improved construction the weight used on the control valve is comparatively very light since it is not raised by water pressure but by the increased impact of the water thereon, when the flow becomes great. Therefore, it will be obvious that when the control valve has been actuated by an increased flow of water and the main valve has been caused to open, the amount of water pressure absorbed in maintaining the valve in its open position will be relatively very small.

The drawing represents a central, vertical section thru a compound meter including an embodiment of this invention.

The meter casing 1 is divided into two parts by an interior partition 2. An inlet port 3 communicates with the compartment or supply chamber 4 formed within the meter casing upon one side of the partition 2 while the outlet port 5 communicates with the high capacity chamber 6 upon the other side of said partition. The chamber 6 is provided with apertures in its upper portion which are closed respectively by the caps 7 and 8, wherein the two sets of registering apparatus are located. The cap 7 contains the low volume registering mechanism, indicated at 9, which is operated by the disk motor 10. The cap 8 contains the high volume meter registering mechanism 11 operable in the usual manner by the metering turbine wheels 12 within the turbine casing 13. Said last mentioned casing 13 is mounted in a passage 15 which communicates directly with the outlet port 5. A duct 16 leads the liquid from the wabble piston 10 into the passage 15 from which it flows to the outlet port 5 without operating the turbine wheels 12. All of the liquid operating said turbine wheels must pass from the chamber 6 into the casing 13 thru one of its openings 14.

The valve embodying this invention is mounted in a valve casing 20. The casing 20 communicates at one end with compartment 4 and at its other end with the interior or low capacity chamber of the cap 7 and the disk motor 10. Said casing is provided intermediate of its ends with a port 21, preferably of substantial size, thru which it is in communication with the interior of the chamber 6.

The valve 22 is provided with upper and lower faces 23 and 24 of differential diameters. The valve seats adjacent its ends upon the two transverse partitions 25 and 26. This valve when closed shuts off the flow of water thru port 21 and chamber 6 to the turbine motor 12. It will be noted that the water pressure upon the larger face 23 of valve 22 will oppose its opening. It must, therefore, be apparent that any increase of pressure within the disk motor 10, or the passages thereto pertaining, cannot cause valve 22 to open.

The differential valve 22 is provided with an axial opening 28 within which is a guide block 29 centrally positioned by means of webs 30 which support it from the side walls of the valve. A valve stem 31 is longitudinally slidable thru the guide block 29. A valve disk 32 carried by said stem is adapted to close the lower end of the axial opening 28. Immediately beneath valve 32 is a tapered flange 34 upon which the water acts to actuate said valve. The collar 27 carried by valve stem 31 and bearing upon the upper end of the guide sleeve 29 supports the valve 32 in operative position relative to the opening of passage 28. A threaded portion 35 of the valve stem 31 carries a weight 36 of the proper size to control the operation of the valve. At its lower end valve stem 35 has a sliding bearing in the portion 37 of a cast bronze screen 38. The valve stem is also provided with a bearing at its upper end in the transverse plate 39. A pair of longitudinal grooves 40 in communication thru slot 41 with each other and with the upper end of valve casing 20 permit the free flow of water thru the bearing flange 42.

In use, the valve embodying this invention operates as follows:—

When no water is being drawn from the supply pipe which communicates with the outlet port 5, the parts will be disposed in the position in which they are shown in the drawing. If a small volume of water is now permitted to flow thru the meter, it will enter from the main thru the inlet port 3 into chamber 4 from which it will pass thru the screen 38, passage 28 and longitudinal grooves 40 to the disk motor 10 which will operate the registering mechanism 9 to register exactly even the minutest quantity of water passing thru the motor. The water delivered from motor 10 exhausts thru the duct 16 into the outlet passage 15 and is delivered thru port 5 into the supply pipe. Valve 22 is maintained in closed position by its own weight and by the pressure upon face 23 of said valve which exceeds the pressure upon face 24 thereof.

If the delivery thru the meter be gradually increased, the impact of the water upon the flange 34 carried by valve stem 35 will be correspondingly increased. When the flow reaches a value predetermined by the weight 36, the impact of the water upon flange 34 will become sufficient to overcome the resistance of weight 36 and will raise the valve stem 35 causing the controlling valve 32 to seat and close the lower end of passage 28. The pressure in the chamber 4 will immediately build up and the pressure at the upper end of the valve casing 20 will be relieved to the point where valve 22 will be lifted, the differential pressure upon the face 23 being overcome. The guide flange 42 will pass within the opening 28 of valve 22 and the upper portion of valve casing 20 will no longer be in communication with any of the water passages. All pressure upon face 23 of valve 22 will consequently be relieved and the only pressure absorbed by this valve mechanism during the operation of the turbine motor metering mechanism 12 will be that small amount of pressure necessary to sustain valves 22 and 32 and weight 36.

When the flow ceases to be sufficiently large to register with the required degree of accuracy thru the turbine motor 12 upon the registering mechanism 11, the weight 36 will cause valve 32 to open, permitting water to enter passage 28 whereupon the pressure upon face 23 of valve 22 will be re-established and said valve will be caused to seat simultaneously upon the shoulders or transverse partition walls 25 and 26. The parts have now been restored to the position in which they appear in the drawing and all water passing thru the meter will be caused to flow thru the disk motor 10.

I claim:—

1. In a meter mechanism, a valve casing provided with a pair of axially aligned valve seats and with a port between said seats, a tubular valve adapted to rest simultaneously upon both seats and provided with end faces of different diameters whereby said valve will normally be held upon its seats by liquid pressure, and an auxiliary valve operable by a predetermined flow of liquid thru the tubular valve to close the passage therethru, whereby the pressure upon the larger face of said tubular valve will be cut off.

2. In a device of the character described, having a low capacity chamber, a high capacity chamber and a supply chamber, a valve casing between said chambers and having a bearing adjacent the supply chamber, a second bearing having a larger diameter than the first mentioned bearing and adjacent the low capacity chamber, said casing being ported intermediate said bearings; a valve having differentially diametered portions, each slidably journaled in a corresponding bearing, whereby to expose a larger area of said valve to pressure in the low capacity chamber than the area of said valve exposed to pressure in the supply chamber; a by-pass duct communicating with the supply chamber and low capacity chamber, and an auxiliary valve operable by fluid flow to close said duct, whereby to relieve the first mentioned valve of pressure in the low capacity chamber.

3. In a metering device having a supply chamber, and low capacity receiving chamber and a high capacity receiving chamber communicating with the first mentioned receiving chamber, the combination with a valve normally disposed between the supply chamber and high capacity receiving chamber provided with faces of differential area, the larger face being disposed in the low capacity receiving chamber, of a by-pass duct communicating with the supply chamber and low capacity receiving chamber, an auxiliary valve operable by fluid flow to close said by-pass duct and having a weight for normally holding said auxiliary valve in open position, whereby when the flow of fluid through such low capacity chamber ceases the pressure on said larger face will be relieved and fluid caused to flow to the high capacity chamber.

4. In a device of the character described, the combination with a supply chamber and a low capacity receiving chamber, of a valve casing apertured intermediate its ends, of a tubular valve disposed within said aperture and having opposed faces of larger and smaller area exposed respectively to pressures in said low capacity receiving chamber and supply chamber, an auxiliary valve journaled in said tubular valve for movement axially relative thereto and adapted to close the opening through said tubular valve, and means for utilizing a determinable volume of flow through the interior of the tubular valve to operate the auxilary valve, whereby pressure in the low capacity receiving chamber will normally maintain said tubular valve upon its valve seat.

EMIL M. KRUEGER.